United States Patent [19]

Zrenner et al.

[11] 4,430,010

[45] Feb. 7, 1984

[54] THERMAL METHOD OF TESTING LIQUIDS FROM A NOZZLE

[75] Inventors: Christian Zrenner, Stuttgart; Peter Kälberer, Gerlingen, both of Fed. Rep. of Germany

[73] Assignee: Robert Bosch GmbH, Stuttgart, Fed. Rep. of Germany

[21] Appl. No.: 312,855

[22] Filed: Oct. 19, 1981

[30] Foreign Application Priority Data

Dec. 2, 1980 [DE] Fed. Rep. of Germany ....... 3045401

[51] Int. Cl.³ ...................... B05C 21/00; G01N 25/18
[52] U.S. Cl. ..................................... 374/45; 239/171; 374/5; 374/135; 374/164
[58] Field of Search ............... 374/164, 147, 135, 138, 374/125, 5, 4; 239/71

[56] References Cited

U.S. PATENT DOCUMENTS

| | | | |
|---|---|---|---|
| 2,645,116 | 7/1953 | Baxter | 239/71 X |
| 2,870,305 | 1/1959 | Ling | 374/164 X |
| 2,941,399 | 6/1960 | Bersinger | 73/117.4 |
| 3,270,560 | 9/1966 | Caveny | 73/117.4 |
| 3,435,400 | 3/1969 | Beckman | 374/147 X |
| 3,729,998 | 5/1973 | Mueller et al. | 374/164 |
| 3,891,391 | 6/1975 | Boone | 73/204 |
| 3,938,544 | 2/1976 | Bernaerts | 374/5 |
| 4,079,620 | 3/1978 | Jester et al. | 374/5 |
| 4,326,780 | 4/1982 | Kim | 73/204 X |
| 4,366,709 | 1/1983 | Eiermann et al. | 73/204 |

OTHER PUBLICATIONS

Publ. "Fluorocarbon Liquid Leak Detector", N. G. Aakaly, IBM Bulletin, vol. 14, No. 5, Oct. 1971, (526990008) p. 1365.

*Primary Examiner*—Daniel M. Yasich
*Attorney, Agent, or Firm*—Michael J. Striker

[57] ABSTRACT

Liquids flowing from a nozzle or the like are tested by providing a sensing element having a heated tip part, directing a liquid to be tested to the tip of the sensing element so that the liquid cools the tip part and thereby an electrical signal is produced, and the thus produced electrical signal is utilized for evaluating the liquid and the nozzle.

12 Claims, 4 Drawing Figures

THERMAL METHOD OF TESTING LIQUIDS FROM A NOZZLE

BACKGROUND OF THE INVENTION

The present invention relates to a method of testing liquids flowing from a nozzle or the like, such as an injection nozzle.

Methods of the above-mentioned general type are known in the art. In a known method, a laser beam is utilized as a sensor in such a manner that the laser beam is interrupted by a fluid leaking from a bad nozzle which is indicated by an electric signal produced in an electronic evaluating circuit. This method is accurate to a certain degree; however, it is expensive inasmuch as it is utilized with a laser light source. Moreover, considerable protective measures must be taken, which are always problematic in a production context.

SUMMARY OF THE INVENTION

Accordingly, it is an object of the present invention to provide a method of testing liquids which avoids the disadvantages of the prior art.

More particularly, it is an object of the present invention to provide a method of testing liquids which not only has higher measuring accuracy but is also considerably less expensive and requires considerably less space than the known methods.

In keeping with these objects, and with others which will become apparent hereinafter, one feature of the present invention resides, briefly stated, in a method of testing a liquid flowing from a nozzle or the like in which a sensing element with a heated tip part is provided, a liquid to be tested is directed onto the tip of the sensing element so that the liquid cools the tip part and thereby an electric signal is produced, and the thus produced electric signal is used for evaluating the liquid or a source of the latter.

When the method of the present invention is performed, it is very accurate, inexpensive and requires small space.

In accordance with another advantageous feature of the present invention, the tip of the sensing element is located near the mouth of the nozzle so that it is moistened by the liquid leaking from the nozzle mouth.

In accordance with still another feature of the present invention, the sensing element includes a plurality of sensing members arranged substantially at a circle with a plurality of tips and at a distance from the nozzle mouth so that the circle of sensing members is located transverse to the liquid stream. The distance between the tips in significantly exceeds of the allowable cross-section of the liquid stream.

A further feature of the present invention resides in the fact that the sensing members are mounted on a ring.

Still a further feature of the present invention is that the electric signals produced by the sensing element are evaluated by an electronic device.

Finally, still a further feature of the present invention is that the sensing element or sensing members have bodies with positive or negative temperature coefficient, and formed as high-temperature conductors, PTC resistors, or thermistors.

The novel features which are considered characteristic for the present invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
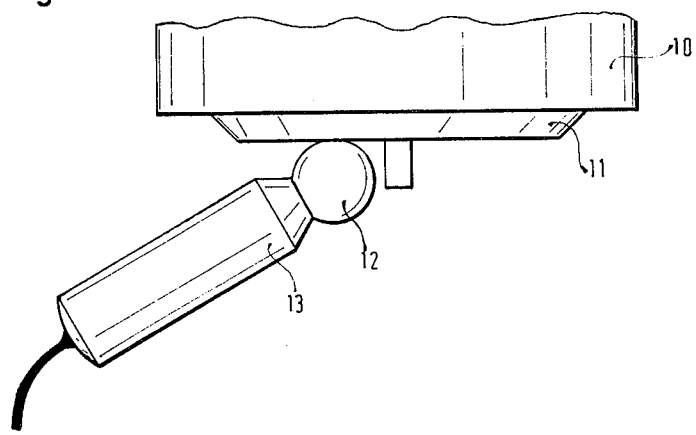
FIGS. 1 and 2 are views showing means for performing an inventive method of testing liquids in accordance with one embodiment of the invention.
Figure 2:
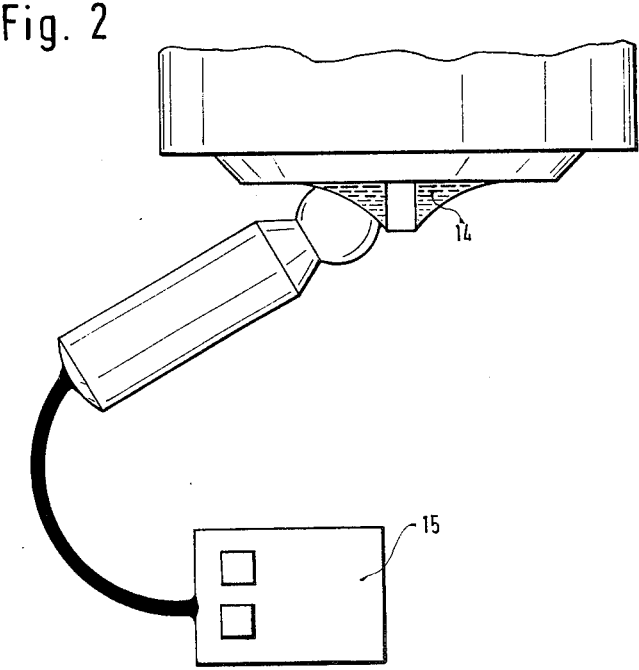
Figure 3:
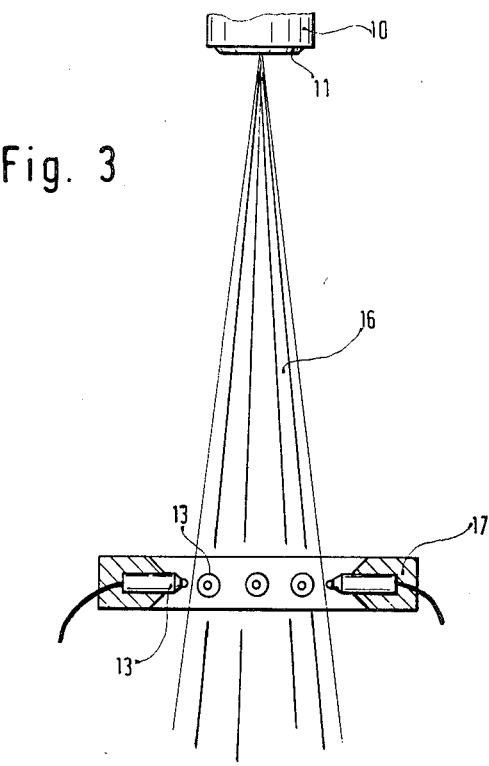
FIGS. 3 and 4 are views showing means for performing the inventive method of testing liquids in accordance with a second embodiment of the invention.
Figure 4:
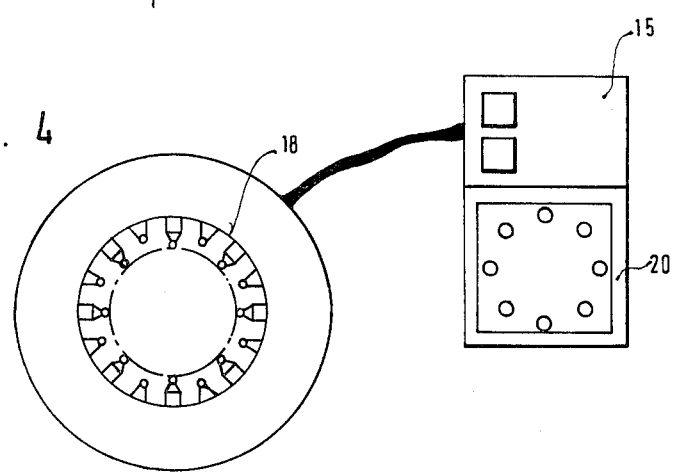

FIGS. 1 and 2 illustrate means for performing an inventive method of testing liquids flowing from an injection nozzle identified by reference numeral 10 and having a nozzle bottom. A high-temperature conductor 13 abuts with its head or tip 12 against the nozzle bottom near the center of the injection nozzle. The high-temperature conductor is composed in a known manner of a material with a negative temperature coefficient, for example magnesium oxide or copper oxide and the like. Such high-temperature conductors are characterized by the fact that, in contrast to low-temperature conductors, their conductivity increases with temperature. The high-temperature conductor 13 is preheated, for example, to 80° C. The very low heat capacity of the ball-shaped head 12 is only insignificantly reduced by the point contact with the dry nozzle bottom. Even such a contact is not absolutely necessary.

When an injection nozzle is not tight, a leaking liquid 14 exits from its mouth and comes into contact with the head 12 of the high-temperature conductor 13. The moistening of the head 12 leads to a very high heat transmission which acts for a strong and fast cooling of the high-temperature conductor 13. The high-temperature conductor has a steep resistance-temperature characteristic line and thereby a very fast response is produced. The electric signal is transmitted to an electronic evaluating circuit 15 where it forms a Yes/No signal and thereby gives information about the heat tightness of the injection nozzle. The signal No means that the injection nozzle is not tight. The electronic evaluating circuit can be completed with a monitor 20 or signal lamps.

In accordance with a second embodiment, the sensing element is utilized for measuring the shape of the stream exiting from the injection nozzle 10. A ring 17 is arranged at a distance a from the nozzle bottom 11 transverse to the nozzle stream and has a throughgoing opening 18. The throughgoing opening 18 has a central axis which coincides with the central axis of the nozzle. Several high-temperature conductors 13 are arranged on the ring 17 at uniform distances from one another. The high-temperature conductor 13 extend radially inwardly beyond the throughgoing opening 18 at an adjustable and identical distance. When the nozzle stream has a correct form, which means that the injection nozzle is in order, the nozzle stream 16 passes through the ring 17 without moistening the head of the high-temperature conductor.

When there is a failure in the injection nozzle, the nozzle stream 16 is unduly wide and moistens one or several heads of the high-temperature conductor 13. The high-temperature conductor 13 which is preheated is thereby continuously cooled and produces an electric signal which is detected in the electronic evaluating circuit 15. Because of the stream speed, also in the event of fine drops the heat is quickly carried off.

The sensing element or elements may be provided with a body having positive or negative temperature coefficients and formed as high-temperature conductors, PTC resistors, thermistors and the like.

The above-described testing method makes possible an automatic and objective test. The electronic processing of the measured values is very simple and the apparatus expenses are low. By respective arrangement of the sensing members, a stream cross-section can be tested. The accuracy of the shape testing can be adjusted by the number of sensing members. It is to be understood that the method can be utilized when the smallest possible liquid quantities (drop dimensions) must be automatically detected.

It will be understood that each of the elements described above, or two or more together, may also find a useful application in other types of constructions differing from the types described above.

While the invention has been illustrated and described as embodied in a method of testing liquids exiting from nozzles and the like, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of testing a liquid flowing from a nozzle having a mouth, or the like, comprising the steps of
   providing a plurality of sensing elements having tips and located so that the sensing elements with the tips are arranged at a distance from the mouth and at a circle in a ring-like element and transverse to a stream of liquid flow from the mouth and to be tested, said flow stream passing through the ring-like element without moistening said tips;
   heating the tips of the sensing elements;
   directing the stream of liquid to be tested on the ring-like element and near the heated tips of the sensing elements, so that when a malfunction occurs in the nozzle, said flow stream widens and the liquid cools the heated tips and thereby an electrical signal is produced; and
   using the thus produced electrical signal for evaluating the liquid.

2. A method as defined in claim 1, wherein said using step includes using the thus produced electrical signal for evaluating a tightness of the nozzle and the like.

3. A method as defined in claim 1, wherein said using step includes using the thus produced electrical signal for evaluating a shape of a nozzle stream.

4. A method as defined in claim 1, wherein said providing step includes using a PTC resistor as the sensing element.

5. A method as defined in claim 1, wherein said providing step includes using a thermistor as the sensing element.

6. A method as defined in claim 1, wherein said forming steps include arranging the tips of the sensing members relative to one another at a distance insignificantly exceeding the cross-section of the liquid stream.

7. A method as defined in claim 1, wherein said forming steps includes mounting said sensing member on a ring.

8. A method as defined in claim 1, wherein said using step includes providing an electronic device and evaluating the thus produced electrical signal by the electronic device.

9. A method as defined in claim 1, wherein said providing step includes providing the sensing element with a body having a positive temperature coefficient.

10. A method as defined in claim 1, wherein said providing step includes providing the sensing element with a body having a negative temperature coefficient.

11. A method as defined in claim 1, wherein said providing step includes using a high-temperature conductor as the sensing element.

12. A device for testing a liquid flowing from a nozzle having a mouth, or the like, comprising
    a plurality of sensing elements having tips and located so that said sensing elements with said tips are arranged at a distance from the mouth and at a circle in a ring-like element and transverse to a stream of liquid to flow from the mouth and to be tested, said flow stream passing through the ring-like element without moistening said tips;
    heating means for heating said tips of said sensing elements, so that when a malfunction in the nozzle occurs, said flow stream widens and is directed onto the heated tips of the sensing elements the liquid cools the tips and thereby an electrical signal is produced; and
    means for using the thus produced electrical signal for evaluating the liquid.

* * * * *